Feb. 7, 1961 T. U. MARRON 2,970,534
PLANOGRAPHIC PRINTING PLATES AND
METHODS FOR MANUFACTURING SAME
Original Filed March 27, 1952
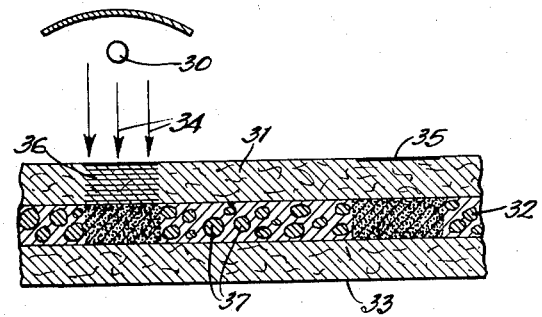
INVENTOR:
Thomas U. Marron,
BY
Owen McDougall Williams & Hersh
ATTORNEYS.

United States Patent Office 2,970,534
Patented Feb. 7, 1961

2,970,534

PLANOGRAPHIC PRINTING PLATES AND METHODS FOR MANUFACTURING SAME

Thomas U. Marron, Glenview, Ill., assignor to A. B. Dick Company, Niles, Ill., a corporation of Illinois Original application Mar. 27, 1952, Ser. No. 278,871, now Patent No. 2,800,077, dated July 23, 1957. Divided and this application Apr. 12, 1957, Ser. No. 659,450

5 Claims. (Cl. 101—149.4)

This invention relates to a new and improved planographic printing plate and more particularly to planographic plates for the production of copies by hectographic technique and to new and improved methods for producing the same.

This application is a division of my copending application Ser. No. 278,871, filed March 27, 1952, now U.S. Patent No. 2,800,077.

An important feature of this invention resides in the utilization of the concepts described and claimed herein in the manufacture of a master for hectograph duplication and particularly for use in spirit duplicating systems.

In spirit duplicating processes as they are presently known, the image is formed on the surface of a hectograph plate by inscribing, drawing, typing or die-impressing to apply a composition containing a high concentration of a water soluble dye in a base capable of being removed slowly as by solution in water or alcohol or a combination of water and alcohol or other solvent. The design or letter outline on the surface of the hectograph plate is then contacted in the duplicating machine with copy paper which has previously been moistened by an aqueous system. A portion of the dye forming the image is dissolved in this medium and consequently transfers in part from the hectograph master to the impression paper to duplicate the image thereon. A substantial number of copies can be made from the hectograph master before the dye is removed therefrom in sufficient quantity to militate against production of good copy.

It will be apparent from this description that the problems in forming a suitable image on the hectograph master and the use thereof in the manufacture of copy of good quality corresponds in many ways to the practice with the lithographic plate.

Therefore, it is an object of this invention to produce and to provide a method for producing a new and improved hectograph plate and it is a related object to provide means for producing an imaged plate without inscription with imaging materials.

It is an object of this invention to produce a new and improved hectographic plate and method for the manufacture and imaging of same.

These and other objects and advantages of this invention will hereinafter appear and for purposes of illustration, but not of limitation, an embodiment of the invention is shown in the accompanying drawing in which—

The figure is a sectional elevational view of a plate embodying the features of this invention and illustrating a method for forming the image thereon.

In the manufacture of a hectographic plate in accordance with the concepts embodied in this invention, the materials adapted for use in forming the continuous phase of the polyphase system are not limited to hydrophilic film forming materials but may in fact and preferably are selected of film forming materials which are not soluble in water or solvent system used for transfer of the coloring medium by hectographic technique. Thus the continuous phase may be formed of such highly resistant film forming materials as polystyrene, polyvinylidine chloride, polyalkyl acrylates such as polymethylmethacrylate, polyvinyl acetate, vinyl chloride-vinyl acetate copolymer, polyvinyl acetal or butyral, or cellulose ethers and esters of the type nitrocellulose, ethyl cellulose, cellulose acetate, cellulose butyrate and the like resinous materials, or rubber or synthetic elastomeric compositions of the type butadiene-acrylonitrile copolymer, butadiene-styrene copolymer, rubber hydrochloride, chlorinated rubber and the like. For proper strength and flexibility, these film forming materials may be compounded with or without plasticizers or softeners.

The dispersed phase may be formed of a base substance which can be slowly dissolved in an alcohol or an alcohol and water system such as of waxes of the type paraffin wax, Montan wax, esparte wax, beeswax, petrolatum and the like, alone or in admixture with each other. Use may also be made of fats and oils such as hydrogenated castor oil, tallow oils, vegetable oils, animal oils and derivatives thereof. In order to secure sufficient flow for use in transferring to a hectographic surface in the event that the structure embodying features of this invention comprises a carbon type or other transfer sheet, plasticizers or softeners may be incorporated with the materials, such for example as mineral oils, castor oils, petroleum oils, polyethylene glycols, triethylene glycols and the like.

The material forming the continuous phase is preferably formed of the water-insoluble film forming substances previously described in the event that the image is to be formed directly in the polyphase layer. If the polyphase layer is to operate as a transfer medium for depositing the image on an adjacent receptive surface, then the continuous phase may be formed of any film forming material including not only the resinous and rubberlike substances previously described but also the hydrophilic film forming materials used to form the continuous phase in the manufacture of a lithographic plate described, in U.S. Patent No. 2,800,077.

The concentration of film forming material in the coating composition may be varied consistent with a suitable viscosity for use of the treating composition in coating. The amount very often depends upon the specific materials and may range from 15–30 percent by weight polystyrene, 10–20 percent by weight polyvinylidine chloride, 10–30 percent by weight butadiene-acrylonitrile copolymer and 10–20 percent by weight rubber hydrochloride. The ratio of dispersed phase to continuous film forming material may correspond to the amounts used in the manufacture of lithographic plates and the thickness of films desired to be deposited on the backing sheet remains substantially the same. Suitable dyes for use as an ingredient in the dispersed phase may be selected of the rhodamine dyes, saffranine, Victoria green or the like.

Example 15 percent vinyl chloride-vinylidine chloride copolymer
85 percent methyl ethyl ketone A composition containing 40 percent paraffin wax, 50 percent Victoria green dye and 10 percent petroleum oil is dispersed in the solution of vinyl chloride-vinylidine chloride copolymer and the dispersion applied onto a high wet strength paper by a brush coater in amounts to supply a layer having a thickness of about 10 mils. Upon air drying and heating for a short time at a temperature of about 110° F., a polyphase layer is formed having a thickness of about 3 mils.

The above is merely representative of the manufacture of a hectographic plate embodying compositions of this invention. It will be understood that other film forming materials may be substituted for the vinyl chloride-vinylidene chloride copolymer within the defined amounts and that other waxy or oily substances in various combinations may be substituted in whole or in part for paraffin in the dispersed phase.

When the prepared plate is impacted with a typewriter key or other writing instrument for producing the image on the hectograph surface, the wax base composition containing the dye as the dispersed phase is liberated to form the corresponding image on the surface for subsequent use as an imaged plate in normal duplicating operations. Instead of forming the image on the plate surface, the liberated hectograph medium may be transferred onto a hectograph surface in contact therewith and the other plate mounted in the duplicating machine for the production of copies therefrom.

When mounted in the hectograph duplicating machine, the impression paper is wetted on one side with an aqueous alcoholic solution and then pressed into surface contact with the imaged plate whereby a portion of the imaging composition is dissolved and transferred to the impression paper in the production of copy.

A new and novel concept of this invention also resides in the technique for developing an image on the described planographic masters by a method wherein a heat pattern is developed by directing radiations rich in infra-red from a light source 30 onto an original 31 in surface contact with the polyphase coating 32 of the planographic plate 33. The infra-red radiations 34 are absorbed by the letter outlines 35 of the original 31 and converted into heat 36. A heat pattern is formed which transfers to the polyphase layer 32 and is sufficient to cause rupture of the continuous film forming phase in corresponding areas or for other unknown reasons apparently liberates the separate soluble dispersed phase 37 to form an image for use in hectograph duplication. Instead of forming the image on the polyphase layer, transfer may be effected to a receptive surface in contact therewith, as in the transfer sheets previously described. In the latter event, the original may be placed adjacent the master or adjacent the transfer sheet. Considerable advantage results in transfer systems of the type described when the dispersed phase is compounded with a base substance reducible to flowable condition at the elevated temperatures developed.

It will be apparent from this description that there is provided a planographic master which is characterized by exceptional response to impact or pressure and heat to develop an imaged portion thereon for use in duplication by hectographic technique or to transfer an imaged portion onto a surface and form a master for hectograph duplication.

It will be apparent that a transfer sheet of the type produced by this invention is capable of being handled without causing colored material to dirty surfaces or objects in contact therewith thereby to permit use without being subject to the undesirable features of normal carbon sheets, typewriter ribbons or other transfer structures now in use.

More important, preparation of an image for hectograph duplication can be achieved without the use of such ribbons, carbons or other transfer materials inscribed upon the surface of the master thereby to eliminate one element and operation in the preparation of a duplicating master. In addition, a wide variety of materials may be compounded in the dispersed phase or in the continuous phase to enhance the bonding relation between the two substances in effecting a more permanent imaged master and to impart a flexibility in reproduction and in image formation which has not heretofore been available to the copy field.

The structure embodying features of this invention provides a radically new concept in the manufacture of duplicating masters and the production of images therewith. It will be apparent that numerous other advantages flow naturally from structures of the type described and that greater latitude is provided with respect to the colors and designs which may be formed for transfer in the imaged master.

It will be understood that numerous changes may be made in the materials, the details of their application and in their operation without departing from the spirit of the invention, especially as defined in the following claims.

I claim:

1. A structure for use in the manufacture of an imaged hectograph plate comprising a base sheet and a layer on the base sheet formed of a polyphase system having a water and spirit insoluble film forming material as the continuous phase, and a color-containing water and alcohol soluble imaging material dispersed therein as the discontinuous phase.

2. A spirit duplicating plate of the hectograph type having imposed thereon a surface layer in the form of a polyphase system having a film forming, water and spirit insoluble material as the continuous phase and a water and spirit soluble imaging material containing coloring agents as the discontinuous phase.

3. A spirit duplicating plate of the hectograph type comprising a base sheet and a surface layer on the base sheet in the form of a polyphase system having a film forming, water and spirit insoluble material as the continuous phase, and a water and spirit soluble material containing coloring agents dispersed in the continuous phase as the discontinuous phase.

4. A hectograph plate as claimed in claim 3 in which the materials are present in the ratio of 3 parts by weight of the film forming water and spirit insoluble material to 1–6 parts by weight of the imaging material forming the dispersed phase.

5. An imaged spirit duplicating plate of the hectograph type comprising a base sheet, a continuous layer on the surface of the base sheet in the form of a polyphase system having a film-forming, water and spirit insoluble material as the continuous phase and a color-containing, water and spirit soluble imaging material dispersed therein as the discontinuous phase with the color-containing, water and spirit soluble imaging material separated from the polyphase system and disposed on the surface of the plate to form the image thereon in areas of the polyphase system which has been broken while the remaining portions of the surface layer corresponding to the non-imaged areas remain in the form of the polyphase system with the imaging material dispersed as the discontinuous phase within the continuous phase of the water and spirit insoluble material which prevents the exposure of the color-containing imaging material for transfer from the non-imaged areas.

References Cited in the file of this patent

UNITED STATES PATENTS

| | | |
|---|---|---|
| 1,245,120 | Neidich | Oct. 30, 1917 |
| 2,299,693 | Green | Oct. 20, 1942 |
| 2,374,862 | Green | May 1, 1945 |
| 2,398,779 | Dalton et al. | Apr. 23, 1946 |
| 2,611,313 | Keller et al. | Sept. 23, 1952 |